United States Patent [19]

Marcatili

[11] 4,057,320
[45] Nov. 8, 1977

[54] OPTICAL FIBER WAVEGUIDE HAVING MINIMUM MODAL DISPERSION

[75] Inventor: Enrique Alfredo Jose Marcatili, Rumson, N.J.

[73] Assignee: Bell Telephone Laboratories, Incorporated, Murray Hill, N.J.

[21] Appl. No.: 709,010

[22] Filed: July 26, 1976

[51] Int. Cl.² .............................................. G02B 5/14
[52] U.S. Cl. ......................... 350/96 GN; 350/96 WG
[58] Field of Search ................... 350/96 WG, 96 GN

[56] References Cited

U.S. PATENT DOCUMENTS

| | | | |
|---|---|---|---|
| 3,904,268 | 9/1975 | Keck et al. | 350/96 WG |
| 4,006,962 | 2/1977 | Olshansky | 350/96 WG |

OTHER PUBLICATIONS

Gloge et al. "Multimode Theory of Graded-Core Fibers" Bell System Tech. Journal, Nov. 1973 pp. 1563-1578.

"Pulse Broadening in Multimode Optical Fibres With Large Δ n/n", by Arnaud et al. Electronic Letters Apr. 1976, pp. 167-169.

Bean and Fiber Optics (Textbook) by J. A. Arnaud, Academic Press, Inc. New York, N.Y. Feb. 1976, Section 5.19 pp. 418-428.

*Primary Examiner*—John K. Corbin
*Assistant Examiner*—Stewart Levy
*Attorney, Agent, or Firm*—Daniel D. Dubosky

[57] ABSTRACT

A graded index optical fiber waveguide for use in an optical communication system is disclosed. The waveguide is a circular symmetric fiber having a cladding with an index of refraction $n_2$ surrounding a core whose index of refraction is graded from an on axis value of $n_1$ to a value of $n_2$ at the core-cladding interface. The index of refraction within the core is defined in terms of a profile function F by the following equation $$n^2 = n_1^2(1\text{-}F)$$

where F is O on the axis and a function of the radial coordinate $r$ and wavelength $\lambda$ within the core and satisfies the following equation $$\frac{1 + \frac{r}{2F} \frac{\partial F}{\partial r}}{1 - \frac{n_1}{2N_1} \frac{\lambda}{F} \frac{\partial F}{\partial \lambda}} = D$$

where D is a function of $\lambda$ having a value approximately equal to 2 for minimum modal dispersion and

$$N_1 = n_1(1 - \frac{\lambda}{n_1} \frac{dn_1}{d\lambda})$$

is the group index on axis.

The modal dispersion achieved with this design is only a function of $n_1 - n_2$ and is independent of the profile dispersion $$\frac{n_1}{N_1} \frac{\lambda}{F} \frac{\partial F}{\partial \lambda}.$$

8 Claims, 6 Drawing Figures

OPTICAL FIBER WAVEGUIDE HAVING MINIMUM MODAL DISPERSION

BACKGROUND OF THE INVENTION

This invention relates to multimode, circular-symmetric, isotropic, optical fiber waveguides and, more particularly, to optical fiber waveguides in which it is desirable to achieve minimum modal dispersion.

Optical fiber waveguides are now well recognized in the art as desirable mediums for transmitting optical information. Initially these optical fibers were constructed with a core having a uniform index of refraction surrounded by a cladding with a lower valued index of refraction. In this type of optical fiber waveguide with a stepped index profile and optical energy is coupled into the core, and the energy is transmitted to the far end of the optical fiber through a process of multiple reflections from the core-cladding interface.

One difficulty found with the multimode optical fiber having a stepped index profile is related to the fact that the various modes take widely different transit times. The modes which encounter very few reflections appear at the receiving end of the fiber much sooner than the modes which encounter many reflections. Since the latter modes are caused to travel through a longer length of the medium before reaching the receiving end of the fiber, this multimode effect causes any optical pulse transmitted through the fiber to encounter pulse dispersion.

A technique for reducing the effect of this multimode dispersion was disclosed in the article entitled "Multimode Theory of Gradient Core Fibers" by D. Gloge and E. A. J. Marcatili published in the November, 1973 issue of the *Bell System Technical Journal* pg. 1653–1678. In accordance with this technique, the index of refraction is caused to change along the radius of the fiber. The index of refraction at the core center has the highest value, and the index is changed in a roughly parabolic shape so as to decrease to the value of the index in the cladding at the core-cladding interface. The index profile in this type of fiber waveguide is given by the equation $$n(r) = n_1[1 - 2\Delta(\tfrac{r}{a})^\alpha]^{\frac{1}{2}} \text{ for } r \leq a$$

$$n_2 = n_1[1 - 2\Delta]^{\frac{1}{2}} \text{ for } > a$$

where $n_1$ is the on-axis refractive index, $n_2$ is the refractive index of the cladding and of the fiber core at radius $a$, $$\Delta = \frac{n_1^2 - n_2^2}{2n_1^2}$$

and $a$ is the core radius. For $\alpha = 2(1 - \Delta)$ the fiber has an almost parabolic index profile, and the modes do not differ in transit time much from each other.

In the Gloge-Marcatili analysis, it was assumed that a parameter identified as profile dispersion is negligible. This parameter, profile dispersion, will be identified more completely hereinafter. At this point, it need not only be said that the profile dispersion is a function of the rate of change of the index with respect to wavelength.

The above-identified analysis by Gloge and Marcatili was extended in a very important way by D. B. Keck and R. Olshansky to optical fibers, wherein the profile dispersion is constant throughout the radius of the fiber core. See, for example, U.S. Pat. No. 3,904,268 entitled "Optical Waveguide Having Optimal Index Gradient" issued Sept. 9, 1975 to D. B. Keck and R. Olshansky. Where the profile dispersion is constant, it was determined by Keck and Olshansky that the index profile still follows a power law for minimum modal dispersion, but the exponent $\alpha$ in the index profile equation requires a value other than $2(1-\Delta)$. Specifically, the exponent $\alpha$ should satisfy the following equation for optimal modal dispersion:

$$\alpha = 2 + y - \frac{(4+y)(3+y)}{(5+2y)},$$

where $$y = \frac{2n_1}{N_1} \frac{\lambda d\Delta/d\lambda}{\Delta}.$$

It has recently been determined though that the profile dispersion in graded index profiles is not constant with respect to radius for some of the dopants that are presently being used to shape the index profile. See, for example, the article entitled "Pulse Broadening in Multimode Optical Fiber With Large $\Delta n/n$" by J. A. Arnaud and J. W. Fleming to be published in *Electronics Letters*. In accordance with the mathematical technique presented by Arnaud and Fleming, the RMS impulse response width of an optical fiber can be determined using measured values of $dn/d\lambda$. As pointed out in their article, the RMS impulse response width for fibers with germanium dopant do not achieve the optimum impulse response dictated by the theory established by Olshansky and Keck. As is further pointed out as in the Arnaud and Fleming article, this lack of agreement is due primarily to the fact that $(1/n)dn/d\lambda$ is not a constant as assumed in Olshansky and Keck's theory. In terms of the analysis to be presented hereinafter $(1/n)dn/d\lambda$ is assumed to be an arbitrary function of $\lambda$ and $r$, and consequently the results of Gloge et al and Olshansky et al are extended to cover a vast class of fibers.

SUMMARY OF THE INVENTION

It is an object of the present invention to increase the information carrying capacity of an optical fiber communication system by employing a graded index optical waveguide having an optimal index gradient for reducing dispersion even in those fibers which use dopants that have profile dispersions other than constant. Briefly, the invention relates to optical fiber waveguides in which the index of refraction is graded in the core in accordance with the following equation $$n^2 = n_1^2(1-F)$$

where $n_1$ is the index on the axis and the function F is the profile function of the fiber. This function F is 0 on the axis and is a function of a radial coordinate $r$ and wavelength $\lambda$ within the core. At the cladding-core interface the function F is equal to $2\Delta$ where $$\Delta = \frac{n_1^2 - n_2^2}{2n_1^2}$$

and $n_2$ is the index of refraction in the cladding. The profile dispersion $p$ in this type of optical waveguide can be expressed in terms of the following equation $$p = \frac{n_1}{N_1} \frac{\lambda}{F} \frac{\partial F}{\partial \lambda}$$

where $N_1$ is the group index on axis. As pointed out hereinafter, the parameter $p$, the profile dispersion, can be obtained by taking measurements of $n$ and $dn/d\lambda$ on the various glasses with different concentration of dopants to be used in the construction of the fiber.

Using these parameters the profile function (and consequently the index profile) that achieves minimum modal dispersion in a fiber having any arbitrary profile dispersion can be obtained in accordance with the present invention by solving the following general equation $$\frac{1 + \frac{r}{2F} \frac{\partial F}{\partial r}}{1 - \frac{p}{2}} = D \qquad (I)$$

where D is an arbitrary function of $\lambda$ having a value approximately equal to 2 for minimum modal dispersion. This parameter D, designated hereinafter as the dispersion parameter, is more precisely set equal to $1 + \sqrt{1 - 2\Delta}$ to achieve minimum impulse response width.

As mentioned before, by taking measurements of the index of refraction and its derivatives with respect to $\lambda$ for the doped glasses that are to be used to provide the index profile, the profile dispersion $p$ can be determined for all values of F. Accordingly, the above general equation can then be solved in order to determine the function of F with respect to radius. This determination of F dictates the index profile that is required to provide the minimum impulse response width.

In cases where only a single wavelength is to be used and, therefore, D is a constant, the profile dispersion is only a function of the radius $r$; therefore the partial differential equation is reduced to an ordinary differential equation whose solution yields the optimum index profile in terms of the profile dispersion $p$ and the dispersion parameter D:

$$r = a \exp \int_F^{2\Delta} \frac{dF}{[2 - D(2 - p)]F} \qquad (II)$$

where the profile dispersion $p$ is a function of F determined by measurement of $n$ and its derivatives with respect to wavelength. This profile dispersion and the constant D can be inserted into this integral equation and the value of the radius $r$ for any particular value of the index profile F can be determined from the equation. The resulting specification of the radial position for each value of F completely determines the dielectric profile of $n$ versus $r$.

Up to now we have assumed $p$ known (from measurements) and have calculated F via either one of above two equations I or II.

In accordance with a second important feature of the present invention, the index profile can be chosen to satisfy another criteria besides that of minimum modal dispersion. This criteria might, for example, be the establishment of an optical fiber with larger numerical aperture. The index profile under these circumstances is known as a function of radius and can, therefore, be utilized in the above general equation (I) to find the profile dispersion which is necessary to provide minimum modal dispersion. As a result of this additional feature, an optical fiber with minimum modal dispersion and a larger numerical aperture than was heretofore available in the prior art can be manufactured. To construct this fiber a maximum amount of index-increasing dopant can be utilized on the axis of the core and this index-increasing dopant can be graded to 0 at a point in the radius between the axis and the core-cladding interface. From this point outward toward the core-cladding interface an index-decreasing dopant can be utilized grading out to a maximum amount of this dopant at the core-cladding interface. This fiber will be shown later to have a discontinuous index profile and the minimum modal dispersion is achieved by providing a profile dispersion which is dictated by the above equation (I).

DETAILED DESCRIPTION

Figure 1:
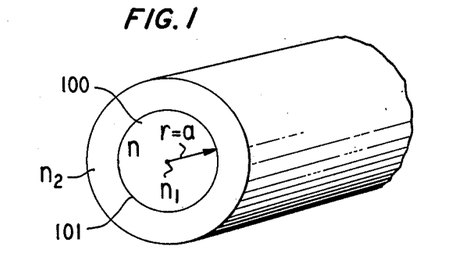
FIG. 1 shows a segment of an optical fiber waveguide used to practice the present invention.

The present invention is useful in optical fiber waveguides of the type illustrated in FIG. 1. In this type of waveguide the core 100 is circular-symmetric, having a cross-sectional radius equal to $a$ and the index of refraction $n$ is graded from the on axis value of $n_1$ to the value of $n_2$ at the core-cladding interface 101. With $n_1 > n_2$ optical energy coupled into the core is confined to the core and this energy is propagated through the optical fiber to a receiving location.

In my above-identified article with D. C. Gloge entitled "Multimode Theory of Graded-Core Fibers," a WKB approximation is utilized to obtain an equation which relates the propagation constant $\beta$ of a mode characterized by the radial and azimuthal wave numbers $\mu$ and $\nu$ to the free space propagation constant $k$, where $k = 2\pi/\lambda$. The refractive index is designated by $n$, and the radial coordinate is designated by $r$. This equation is as follows $$\mu = \frac{1}{\pi} \int_{r_1}^{r_2} \rho \frac{dr}{r} \qquad (1)$$

where $$\rho = \sqrt{(k^2 n^2 - \beta^2)r^2 - \nu^2}. \qquad (2)$$

In these equations, $r_1$ and $r_2$ are the two turning points in the radial coordinate that cause the radical to be equal to zero ($\rho = 0$), and between which points most of the field of the mode is concentrated. In further manipulation of this equation, it is useful to define the index of refraction with the following equation:

$$n^2 = n_1^2(1-F) \quad (3)$$

and to define the propagation constant $\beta$ by the following equation $$\beta^2 = k^2 n_1^2(1-B) \quad (4)$$

where F is a profile function which is equal to zero on the axis and is an arbitrary function of $r$ and wavelength $\lambda$ within the core, while it is equal to $2\Delta$ in the cladding. Similarly, B is a mode parameter which varies between zero for the lowest order mode and is equal to $2\Delta$ for the modes whose phase velocities coincide with that of a plain wave in the cladding. Using these definitions of $\beta$ and $n$ in the radical representing $\rho$ in equation 2 becomes:

$$\rho = \sqrt{(kn_1 r)^2(B-F) - \nu^2} \quad (5)$$

The group velocity of a mode can be introduced by taking the derivative with respect to the free space wavelength, $\lambda$, of both sides of equation (1). Inasmuch as the radial mode number $\mu$ should not be dependent on wavelength, the derivative of $\mu$ with respect to wavelength can be set equal to zero thereby resulting in the following equation:

$$\int_{r_1}^{r_2} [B(1 - \frac{n_1}{2N_1} \frac{\lambda}{B} \frac{dB}{d\lambda}) - F(1 - \frac{p}{2})] \frac{r}{\rho} dr = 0 \quad (6)$$

where $$N_1 = n_1(1 - \frac{\lambda}{n_1} \frac{dn_1}{d\lambda}), \quad (7)$$

$$p = \frac{n_1}{N_1} \frac{\lambda}{F} \frac{\partial F}{\partial \lambda}, \quad (8)$$

$N_1$ is the group index on the axis, and $p$ is a generalized version of the profile dispersion. A similar profile dispersion is defined and measured in the article entitled "Profile Dispersion in Multi-Mode Fibers: Measurement and Analysis", by D. Gloge, I. P. Kaminow, H. M. Presby, *Electronics Letters*, Sept. 18, 1976, Vol. 11, No. 19 pp. 469-471. Since F is both a function of $r$ and $\lambda$, the profile dispersion as given in (8) as in general also a function of $\lambda$ and $r$.

The derivative of the mode parameter B with respect to $\lambda$ can be expressed in terms of the group delay $t$ of a particular mode by taking the square roots and derivatives of both sides of equation (1). The following equation results:

$$\frac{d\beta}{dkn_1} = \frac{t}{T} = \sqrt{1-B} + \frac{n_1}{2N_1} \frac{\lambda}{\sqrt{1-B}} \frac{dB}{d\lambda} \quad (9)$$

in which T, the flight time for the ray on the core axis, is related to the delay of a plain wave in a medium having a group index $N_1$ and a length L by the following equation:

$$T = \frac{LN_1}{c} \quad (10)$$

where $c$ is the velocity of light in free space. Substituting the value of $dB/d\lambda$ obtained from equation (9) into equation (6) yields the following integral:

$$\int_{r_1}^{r_2} [1 - \sqrt{1-B} \frac{t}{T} - F(1 - \frac{p}{2})] \frac{r}{\rho} dr = 0. \quad (11)$$

This integral equation was solved in prior art references by assuming that the profile dispersion, $p$, is a constant with respect to radius. As pointed out in the above-identified article by J. A. Arnaud and J. W. Fleming, this assumption cannot be made where large concentrations of chemical dopants are utilized in order to achieve a desired index profile.

Taking note of the fact that the radical $\rho = 0$ at the radial turning points of $r_1$ and $r_2$, the following self-evident expression may be written:

$$\int_{r_1}^{r_2} \frac{\partial \rho}{\partial r} dr = \rho(r_2, \lambda) - \rho(r_1, \lambda) = 0 \quad (12)$$

This integral expression becomes very useful if the $(\delta \rho/\delta r)$ is obtained by operating upon equation (5) and this result is then inserted into equation (12). The following equation then results:

$$\int_{r_1}^{r_2} [B - F - \frac{r}{2} \frac{\partial F}{\partial r}] r \frac{dr}{\rho} = 0 \quad (13)$$

In this latter equation, it should be noted that B, the mode parameter, is not a function of the radial coordinate $r$, and therefore equation (13) can be rewritten in the following form:

$$B \int_{r_1}^{r_2} r \frac{dr}{\rho} = \int_{r_1}^{r_2} [F + \frac{r}{2} \frac{\partial F}{\partial r}] r \frac{dr}{\rho} \quad (14)$$

In addition to the mode parameter B, the group delay $t$ of the mode is also independent of the radial coordinate $r$, as T, the flight time on axis, and therefore equation 11 can be expressed in the following form:

$$[1 - \sqrt{1-B} \frac{t}{T}] \int_{r_1}^{r_2} \frac{r}{\rho} dr = \int_{r_1}^{r_2} F(1 - \frac{p}{2}) \frac{r}{\rho} \quad (15)$$

Equation 15 can then be divided by equation 14 to yield the following general expression:

$$\frac{1 - \sqrt{1-B} \frac{t}{T}}{B} = \frac{\int_{r_1}^{r_2} (1 - \frac{p}{2}) \frac{Fr}{\rho} dr}{\int_{r_1}^{r_2} (1 + \frac{r}{2F} \frac{\partial F}{\partial r}) \frac{Fr}{\rho} dr} \quad (16)$$

This expression is valid for any circular-symmetric optical fiber with isotropic dielectric and in general, is still difficult to solve exactly. If, however, a particular special family of fibers is considered wherein the index profile and the profile dispersion are related in accordance with the following equation:

$$\frac{1 + \frac{r}{2F} \frac{\partial F}{\partial r}}{1 - \frac{p}{2}} = D \qquad (17)$$

where D is an arbitrary function of the wavelength $\lambda$, the above general expression (16) can then be solved and reduced to the following form:

$$t = T \frac{1 - \frac{B}{D}}{\sqrt{1 - B}} \qquad (18)$$

In this latter expression, $t$, the group delay of a particular mode is characterized by the mode parameter B, the flight time of a ray on axis T, and this newly introduced dispersion parameter D. This expression indicates that the group delay of a mode is only a function of the mode parameter B and the dispersion parameter D. Most importantly, this group delay is independent of the mode numbers (which means that modes with the same propagation constant have the same delay) and is also independent of the profile function and of the profile dispersion.

The impulse response width can be determined from equation (18) by finding the differences between the flight time of the slowest and fastest modes or rays for any given value of the dispersion parameter D. It can easily be determined that the minimum differences between the fastest and slowest modes occurs if D is chosen in accordance with the following equation:

$$D_o = 1 + \sqrt{1 - 2\Delta} \text{ or } D_o \simeq 2 - \Delta \text{ for } \Delta << 1 \qquad (19)$$

With this value of D equal to $D_o$, the lowest and highest order modes characterized by $B = 0$ and $B = 2\Delta$ respectively are the slowest modes and they arrive at the end of the fiber after a flight time equal to T. The modes characterized by $B = 1 - \sqrt{1 - 2\Delta}$ are the fastest modes and they arrive at the end of the fiber at a minimum time dictated by the following equation:

$$t_{min} = T \frac{2(1 - 2\Delta)^{\frac{1}{2}}}{1 + \sqrt{1 - 2\Delta}} \qquad (20)$$

Figure 2:
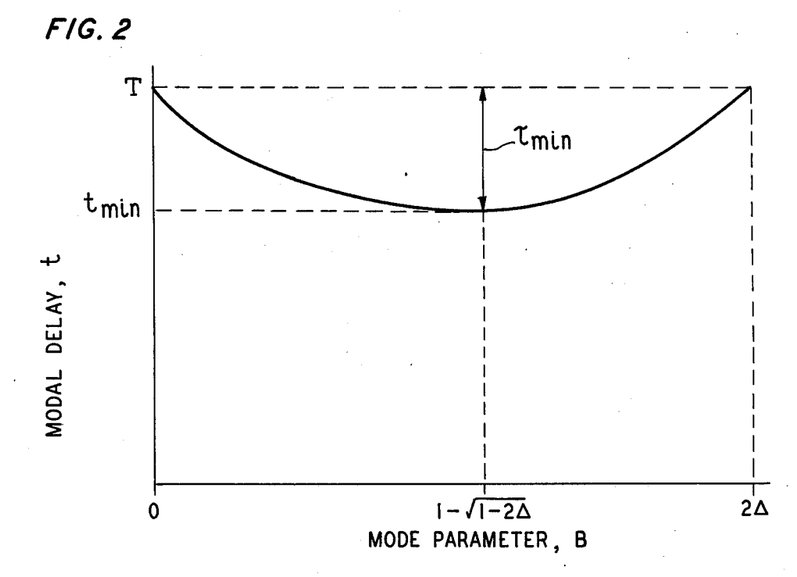
FIG. 2 is a graph of transit time versus mode parameter for a fiber constructed in accordance with the present invention.

A plot of equation (18) for the optimum value of the dispersion parameter $D_O$ is given in FIG. 2.

As pointed out hereinabove, the dispersion parameter D is ordinarily a function of wavelength $\lambda$. If, however, the operation of the fiber is restricted to a single wavelength or to a narrow band, the dispersion parameter D is a constant value. Under these circumstances the generalized equation (17) can be simplified. The profile dispersion is a function of the radial coordinate r, and the partial derivative of the profile function F is reduced to an ordinary derivative. Under these conditions equation (17) takes on the simplified form of $$\frac{1 + \frac{r}{2F} \frac{dF}{dr}}{1 - \frac{p}{2}} = D \qquad (21)$$

This latter equation can be used two ways. If the profile dispersion p is known as a function of the profile function F, the equation can be solved to determine the index profile that will give the minimum impulse width. Secondly, the index profile can be specified in an arbitrary manner, and the equation can be solved to determine what profile dispersion versus radius is necessary to obtain minimum impulse width.

In accordance with the first usage of the equation, that is where the profile dispersion is known as a function of F or r, a most convenient form of equation (21) is as follows:

$$r = a \exp \int_F^{2\Delta} \frac{dF}{[2 - D(2 - p)]F} \qquad (22)$$

To use this latter equation, the profile dispersion p can be measured for a multimode fiber in the manner set forth in the article entitled "Profile Dispersion in Multimode Fibers: Measurement and Analysis" by D. Gloge, I. P. Kaminow and H. M. Presby, *Electronics Letters*, Sept. 18, 1975, Vol. 11, No. 19, pp. 469-471. The Gloge et al article presents a desirable technique for measuring the index of refraction of optical fibers since it measures that index directly on a fiber after the fiber has undergone its total history of temperature changes. As is well known to those skilled in the art, the index of refraction is a function not only of the wavelength and dopants used but also of the numerous temperature changes that the glassy material has encountered.

Still others in the art measure index of refraction and the derivatives of this index by taking measurements on bulk samples. Mr. J. W. Fleming has taken measurements on bulk samples using $GeO_2$-$B_2O_2$-$SiO_2$ glasses and presented these results at the fall meeting of the American Ceramic Society in October, 1975. The results of these measurements are also presented on pp. 418-428 of the text entitled "Beam and Fiber Optics" by J. A. Arnaud, Academic Press, Feb. 1, 1976. In all of these measurements both the index of refraction $n$ (or $n^2$) and the derivative of $n^2$ with respect to the wavelength $\lambda$ can be determined for the various dopants that are to be used in an optical fiber.

Thus, using the definition of the profile function F given in equation (3), we can easily establish an equation which gives us the values of F for each of the various indices $n$ generated with different quantities of dopant to be utilized. This equation is as follows $$F = 1 - \frac{n^2}{n_1^2} \qquad (23)$$

A simple derivative of the latter equation with respect to wavelength also provides us with the derivative of the profile function with respect to $\lambda$ $$\frac{dF}{d\lambda} = -\frac{1}{n_1^2} \frac{dn^2}{d\lambda} + \frac{n^2}{n_1^4} \frac{dn_1^2}{d\lambda} \qquad (24)$$

Using equations (23), (24) and equation (8), which defines the profile dispersion, we can obtain the value of profile dispersion for each and every value of F that can be achieved by the various quantities of dopant to be utilized in the construction of an optical fiber. Hence, measurements of the type already performed in the art can be utilized to determine the dispersion parameter as a function of F. These values can be utilized in equation (22) along with the desired value of the dispersion parameter D, and this equation can then be solved to determine the radial location r for each and every value of the profile function F. In summary, the dispersion parameter $p$ can be obtained by measurement techniques well known in the art and equation (22) can be utilized in order to determine the index profile F that is required in order to obtain minimum modal dispersion.

Figure 3:
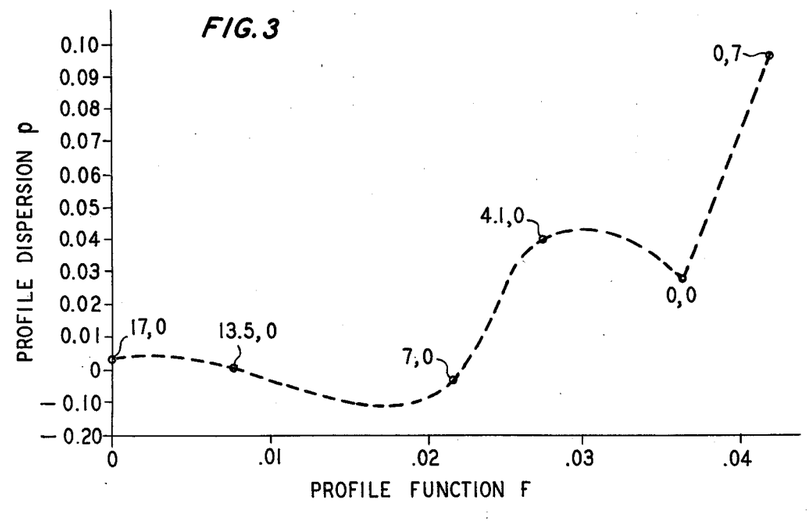
FIG. 3 is a graph of the profile dispersion $p$ versus F obtained from measurements on bulk samples having various concentrations of the dopants $GeO_2$ and $B_2O_3$ in a $SiO_2$ optical fiber.
Figure 4:
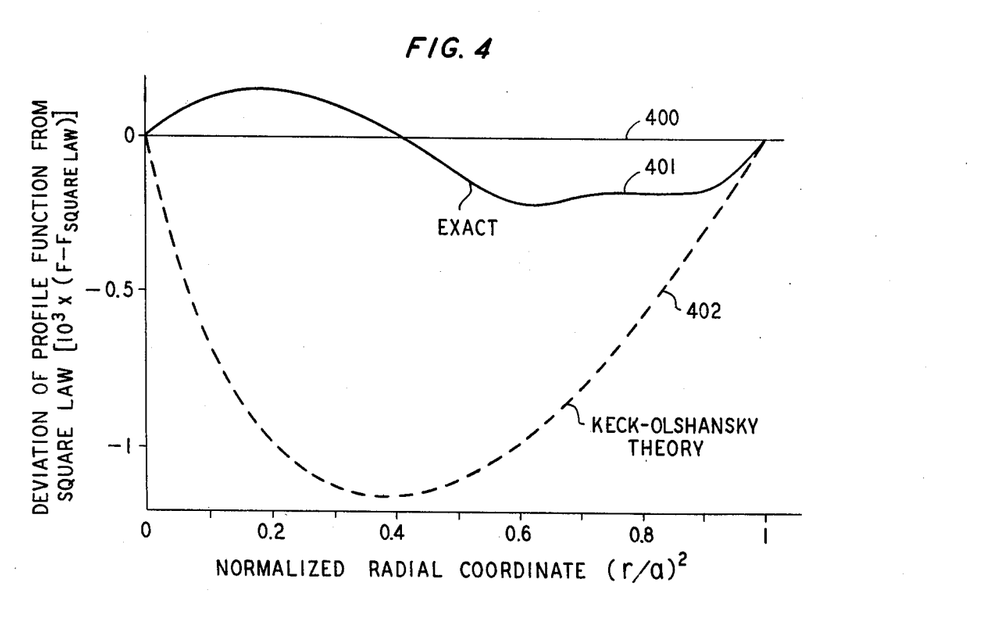
FIG. 4 is a plot of the correct deviation of the profile function F from the F for a square law versus a normalized radius obtained by using the exact theory of the present invention as compared with the simplified theory of Olshansky and Keck which assumes a constant profile dispersion.

FIGS. 3 and 4 illustrate an application of the above technique in the design of an optical fiber having minimum modal dispersion using germanium oxide ($GeO_2$) and boron oxide dopants ($B_2O_3$) dopants in a silicon dioxide ($SiO_2$) fiber. As pointed out hereinabove, measurements on bulk samples of silicon dioxide using germanium oxide and boron oxide as dopants have been performed by Fleming and previously reported in the literature. Using the results of these measurements as reported on page 419 of the above-identified text by Arnaud, values of $n^2$ and the derivative of $n^2$ with respect to wavelength can be computed for each of the various concentrations of $GeO_2$ and $B_2O_3$. As is well known to those skilled in the art, germanium oxide increases refractive index and boron oxide decreases the refractive index. Arbitrarily choosing a maximum value of 17 percent molar concentration of germanium oxide as the material to be used on the fiber axis, values of the profile function F can be determined for all of the other molar concentrations to be utilized in the fiber by using equation (23). Using both the determined values of $n^2$ and $dn^2/d\lambda$ the derivative of the profile function F with respect to wavelength can be computed using equation (24). At this point, the profile dispersion $p$ can be computed using equation (8) for each of the molar concentrations to be utilized in the fiber. A plot of the profile dispersion versus the profile function for the selected values of germanium oxide and boron oxide to be used in the fiber is presented in FIG. 3. In FIG. 3 each of the computed points is associated with a two-numeral description. The first numeral indicates the molar concentration of germanium oxide ($GeO_2$) and the second numeral indicates the molar concentration of boron oxide ($B_2O_3$).

Using the values of profile dispersion obtained by computation and plotted in FIG. 3, equation (22) can then be solved to determine the radial location $r$ for each value F of the profile function. For the dopants under consideration, solution of equation (22) yields a profile function F that is illustrated in FIG. 4. In FIG. 4 the deviation of the profile function from a square law profile function is plotted versus $(r/a)^2$, normalized radial coordinate. Square law profile function refers to the case where the dielectric profile has a parabolic shape. Horizontal line 400 in FIG. 4 is the plot which would result from a parabolic dielectric profile. The difference between the profile function that is obtained using the exact theory of the present invention and the square law profile is shown in FIG. 4 as the solid line 401. As indicated in FIG. 4, the profile function slightly exceeds the equivalent square law profile function for values of the radial coordinate between 0 and $\sqrt{0.4}a$. For radial coordinates in excess of this value, the profile function F is less than the square law profile function. Recalling the fundamental definition of F given in equation (3), line 401 in FIG. 4 indicates the dielectric profile should be smaller than a parabolic function up to a radial coordinate of about $\sqrt{0.4}a$ and larger than the same parabolic function beyond this point.

Also plotted in FIG. 4 as line 402 is the difference between the profile function obtained using the above-identified Keck-Olshansky theory and the square law profile function. As clearly indicated in FIG. 4, there is a significant difference between the profile function obtained in accordance with the present exact theory and the one which is obtained in accordance with the Keck-Olshansky theory. As further indicated by line 402 in FIG. 4, the Keck-Olshansky theory requires a dielectric profile which for all radial coordinates has a dielectric constant greater than the dielectric constant in a parabolic shape. As pointed out hereinabove, the Keck-Olshansky theory assumes a profile dispersion which is constant with respect to radius and this is clearly not in keeping with the concentration of dopants under consideration.

As indicated hereinabove, it is only in those cases where the dispersion parameter $p$ is a constant that the profile function will follow a power law. Setting $p$ equal to a constant value of $P_o$, the integral equation (22) can be solved to provide the following function for the index profile:

$$F = 2\Delta(\frac{r}{a})^\alpha \quad (25)$$

where
$$\alpha = D(2-P_o) - 2. \quad (26)$$

This last equation establishes the relation between the dispersion parameter D of the fiber and the alpha value so widely used in the prior art literature for fibers with constant profile dispersion. This value of $\alpha$ can most easily be compared to the value presented in the above-identified patent of Keck and Olshansky by recalling from equation (19) hereinabove that the dispersion parameter D has a value approximately equal to 2 for minimum modal dispersion.

As pointed out hereinabove, equation (21) can also be utilized to solve for the profile dispersion which is necessary in order to provide minimum modal dispersion with an arbitrary profile function. This usage can be illustrated in the case of an optical fiber that is designed to provide an increased numerical aperture. As is well known to those skilled in the art, the numerical aperture of a fiber is a function of $\Delta$ which in turn can be increased by increasing the difference between the index of refraction at the axis of the core and the index of refraction at the core-cladding interface.

To obtain an increased numerical aperture one could use a maximum amount of index-increasing dopant such as germanium oxide on the fiber axis and this dopant could be decreased to a concentration of 0 at some point in the core between the core axis and the core-cladding interface. At this point in the core, increasing amounts of an index-decreasing dopant could be added up to the core-cladding interface at which point a constant index could be maintained throughout the cladding.

Figure 5A:
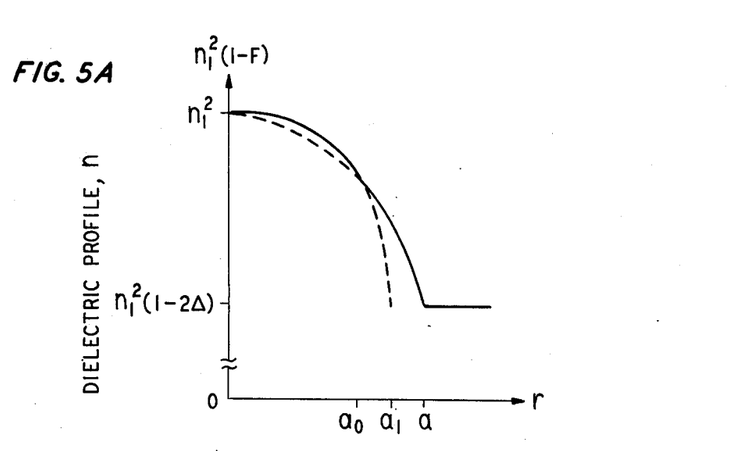
FIG. 5A and B are graphs of the dielectric profile and the profile dispersion versus radius respectively for a fiber designed to provide minimum modal dispersion and increased numerical aperture.

As an illustration let us choose the profile function of the fiber shown in FIG. 5A and represented by the following equations:

$$F = 2\Delta(\frac{r}{a_1})^{\alpha_1} \text{ for } 0 \leq r \leq a_0 \quad (27)$$

$$F = 2\Delta(\frac{r}{a})^{\alpha_2} \text{ for } a_0 \leq r \leq a \quad (28)$$

where $$a_0 = a_1(\frac{a_1}{a})^{\alpha_2/(\alpha_1 - \alpha_2)} \quad (29)$$

To achieve this dielectric profile a maximum amount of index increasing dopant is utilized at $r = 0$ and this dopant is decreased in molar concentration to the point in the core where $r = a_o$. At this point the index-increasing dopant has a molar concentration of O and an index-decreasing dopant is added up to the point where the radial coordinate $r = a$. At this latter point the index-decreasing dopant has a maximum molar concentration.

Substituting equations (27) and (28) into equation (21) and assuming that the dispersion parameter D has its optimum value $D_o$, the required profile dispersion needed to achieve minimum modal dispersion is as follows:

$$p = 2 - \frac{2 + \alpha_1}{D_0} \text{ for } r \leq a_0 \tag{30}$$

$$p = 2 - \frac{2 + \alpha_2}{D_0} \text{ for } a_0 \leq r \leq a. \tag{31}$$

Figure 5B:
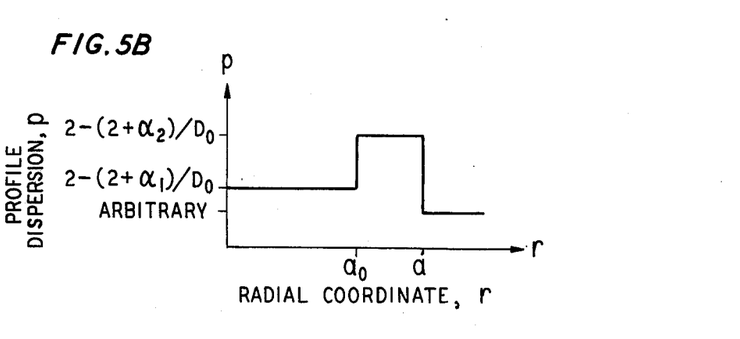

These equations for the profile dispersion are plotted in FIG. 5B. A first constant value of profile dispersion is needed between $r = o$ and $r = a_o$ and a second constant value is required between $r = a_o$ and $r = a$. If the materials chosen to achieve this profile dispersion have a measured profile dispersion that is other than constant, this deviation from a constant value must be taken into acount by solving equation (21) for the correct measured profile dispersion.

Up to this point in determining the index profile which provides minimum modal dispersion we have assumed that the dispersion parameter D is a constant. This assumption is very accurate when the optical fiber is operated over a small range of wavelengths. As pointed out hereinabove, however, the dispersion parameter D is a function of $\lambda$ and variations in this parameter can result in variations in the impulse width unless additional criteria to be described hereinbelow are satisfied.

As pointed out hereinabove in connection with FIG. 2, the optimum dispersion parameter results in a group delay time for the slowest modes equal to T and a group delay time for the fastest modes equal to the value provided by equation (20). If $\tau$ represents the time spread between the fastest and slowest modes, the minimum value for $\tau$ corresponding to the value of D utilized in FIG. 2 can be expressed by the following equation:

$$\tau_{min} = T \frac{[1 - (1 - 2\Delta)^{\frac{1}{2}}]^2}{1 + \sqrt{1 - 2\Delta}}. \tag{32}$$

From this equation it can be seen that fibers with the same $\Delta$ have the same minimum impulse response width and this minimum impulse response width is independent of the index profile and profile dispersion provided the index profile and profile dispersion are related in accordance with the design equation (19). If $\Delta << 1$, the minimum impulse response width can be expressed by the following equation:

$$\tau_{min} \simeq \frac{\Delta^2}{8} T. \tag{33}$$

If the dispersion parameter D is allowed to deviate from its optimum value of $D_o$ by a parameter designated by $\delta$ in the following equation:

$$D = (1+\delta)D_o. \tag{34}$$

The ratio of $\tau/\tau_{min}$ can be expressed where $\delta << 1$ and where $\Delta << 1$ by the following equation:

$$\frac{\tau}{\tau_{min}} = [1 + \frac{2|\delta|}{\Delta}]^2. \tag{35}$$

This latter equation (35) indicates that a small fractional departure of the dispersion parameter from its optimum value results in a substantial change in the impulse response width. In fact, if $\delta$ is equal to $\Delta$, then the impulse response width encountered is nine times larger than the minimum impulse response width.

In view of this sensitivity of the impulse response width to variations in the dispersion parameter, fibers that are to be operated over large bands of wavelengths require additional design criteria to increase the band over which a fiber operates with low modal dispersion. In fact, it is desirable to have the dispersion parameter equal to its optimum value provided in equation (19) and in addition to have the derivative of the dispersion parameter with respect to wavelengths equal to 0. This latter criteria can be met by satisfying the following equation:

$$\frac{\frac{\partial}{\partial \lambda} [\frac{r}{F} \frac{\partial}{\partial r} \frac{F}{r}]}{\frac{\partial p}{\partial \lambda}} = -D_0 \tag{36}$$

which is derived from equation (17) by taking the derivative of both sides with respect to $\lambda$ and setting the derivative of D with respect to $\lambda$ equal to 0. Inasmuch as this last equation involves a derivative of the profile dispersion with respect to $\lambda$, this last equation requires control over the second derivative F with respect to $\lambda$. If this second derivative of the profile function is controlled by the designer and both of the equations (17) and (36) are satisfied, minimum modal dispersion can be controlled over substantially broader frequency bands.

It can easily be extrapolated that control over higher derivatives permits even further demands on D. In fact, if all the higher derivatives are controllable, $D(\lambda)$ can be chosen arbitrarily and the profile F is the solution of equation (17) subject to the conditions of being zero at $r = 0$ and $2\Delta(\lambda)$ at $r = a$.

What is claimed is:

1. A circular-symmetric optical fiber waveguide comprising a core surrounded by a layer of cladding material, the refractive index of said layer $n_2$ being less than $n_1$, the value of the index of refraction on the axis of the core, and the index of refraction $n$ in said core is graded in accordance with the following equation $$n^2 = n_1^2(1-F),$$

where F is a profile function equal to zero on the axis and equal to $(n_1^2 - n_2^2)/n_1^2$ at the core-cladding interface, characterized in that the profile dispersion is a non-constant value with respect to radius given by the following equation $$p = \frac{n_1}{N_1} \frac{\lambda}{F} \frac{\partial F}{\partial \lambda},$$

$N_1$ is the group index on axis, $\lambda$ is the wavelength, and the profile function F is related to the radial coordinate $r$ and the profile dispersion substantially in accordance with the following equation $$\frac{1 + \frac{r}{2F} \frac{\partial F}{\partial r}}{1 - \frac{p}{2}} = D$$

where $D$ is a dispersion parameter approximately equal to 2.

2. An optical fiber waveguide in accordance with claim 1 wherein the frequency range of operation is small such that $D$ is substantially a constant value, and each value of $F$ in the index profile is positioned at a radial coordinate $r$ determined in accordance with the following equation $$r = a \exp \int_F^{2\Delta} \frac{dF}{[2 - D(2 - p)]F}$$

where $\Delta$ is equal to $(n_1^2 - n_2^2)/2n_1^2$ and the profile function $F$ has a value equal to $2\Delta$ at the core-cladding interface.

3. An optical fiber waveguide in accordance with claim 1 where $D$ is equal to $1 + \sqrt{1 - 2\Delta}$, and $\Delta$ is equal to $(n_1^2 - n_2^2)/2n_1^2$.

4. An optical fiber waveguide as defined in claim 3 wherein $\Delta << 1$ and $D$ is approximately equal to $2 - \Delta$.

5. An optical fiber waveguide as defined in claim 1 wherein minimum modal dispersion is achieved over a larger band of wavelengths by choosing the profile function and profile dispersion to satisfy the following equation $$\frac{\frac{\partial}{\partial \lambda} \left( \frac{r}{F} \frac{\partial F}{\partial r} \right)}{\frac{\partial p}{\partial \lambda}} = -D_0$$

where $D_o$ is approximately equal to $1 + \sqrt{1 - 2\Delta}$ and $\Delta = (n_1^2 - n_2^2)/2n_1^2$.

6. A circular symmetric optical fiber waveguide comprising a core having a radius $a$ and an index of refraction $n$ having a value equal to $n_1$ on the axis of the core, a layer of cladding material surrounding said core the refractive index of said layer being less than $n_1$, said core having an index grading such that a maximum amount of index-increasing dopant is present on the axis of said core and a maximum amount of index-decreasing dopant is present at the core-cladding interface, characterized in that the profile dispersion of the material in said core is a nonconstant value with respect to radius and is defined by the following relationship $$p = \frac{n_1}{N_1} \frac{\lambda}{F} \frac{\partial F}{\partial \lambda},$$

where $N_1$ is the group index on the axis and $F$ is the profile function defined by the following relationship $$n^2 = n_1^2 (1-F),$$

and the profile dispersion is related to the profile function in accordance with the following relationship $$\frac{1 + \frac{r}{2F} \frac{dF}{dr}}{1 - \frac{p}{2}} = D$$

where $D$ is approximately equal to 2.

7. An optical fiber waveguide as defined in claim 6 wherein $D$ is equal to $1 + \sqrt{1 - 2\Delta}$.

8. An optical fiber waveguide as defined in claim 6 wherein $\Delta << 1$, and $d$ is equal to $2 - \Delta$.

* * * * *

UNITED STATES PATENT AND TRADEMARK OFFICE
CERTIFICATE OF CORRECTION

PATENT NO. : 4,057,320

DATED : November 8, 1977

INVENTOR(S) : Enrique A. J. Marcatili

It is certified that error appears in the above-identified patent and that said Letters Patent are hereby corrected as shown below:

Title page, right column, line 11, "where F is O" should read --where F is 0--. Column 1, line 16 "profile and optical energy" should read --profile the optical energy--. Column 3, line 28, "$\sqrt{1 - 2\Delta}$" should read --$\sqrt{1 - 2\Delta}$--. Column 5, line 53, "(8) as in general" should read --(8) is in general--. Column 6, line 29, "$(\delta p/\delta r)$" should read --$\partial p/\partial r$--; line 43, that portion of the equation reading $$\begin{matrix} r^2 \\ r^1 \end{matrix}$$  second occurrence, should read  $$\int_{r^1}^{r^2}$$

Signed and Sealed this

Fifteenth Day of April 1980

[SEAL]

Attest:

SIDNEY A. DIAMOND

Attesting Officer　　Commissioner of Patents and Trademarks